United States Patent [19]
Solter et al.

[11] 3,922,767
[45] Dec. 2, 1975

[54] METHOD FOR PRODUCING PRE-MOUNTED RUPTURE DISCS

[75] Inventors: Robert L. Solter, Blue Springs; Franklin A. Hansen, Raytown, both of Mo.

[73] Assignee: Continental Disc Corporation, Riverside, Mo.

[22] Filed: Sept. 17, 1973

[21] Appl. No.: 398,223

Related U.S. Application Data

[63] Continuation-in-part of Ser. No. 189,567, Oct. 15, 1971, abandoned.

[52] U.S. Cl................ 29/157 R; 220/89 A; 72/327; 137/68
[51] Int. Cl.[2] .......................................... B23P 15/00
[58] Field of Search........ 29/157 R; 220/89 A, 89 R, 220/27; 137/68; 72/327, 325, 333

[56] References Cited
UNITED STATES PATENTS

| | | | |
|---|---|---|---|
| 1,665,203 | 4/1928 | Delf | 72/327 |
| 2,224,748 | 12/1940 | Sauer | 220/89 A |
| 2,225,220 | 12/1940 | Huff | 220/89 A |
| 2,987,218 | 6/1961 | Erickson et al. | 220/89 A |
| 3,022,758 | 2/1962 | Rheingold et al. | 72/327 |
| 3,294,277 | 12/1966 | Wood | 220/89 A |
| 3,526,336 | 9/1970 | Wood | 220/89 A |
| 3,685,686 | 8/1972 | Raidl | 220/89 A |

FOREIGN PATENTS OR APPLICATIONS

| | | | |
|---|---|---|---|
| 572,718 | 3/1933 | Germany | 72/327 |

*Primary Examiner*—C. W. Lanham
*Assistant Examiner*—Dan C. Crane
*Attorney, Agent, or Firm*—Fishburn, Gold & Litman

[57] ABSTRACT

In producing safety pressure relief devices of the pre-mounted reverse buckling disc type, the inlet mounting ring disc supporting radius is formed simultaneously with the inlet ring by punching a center circle from the disc blank instead of machining the radius.

4 Claims, 7 Drawing Figures

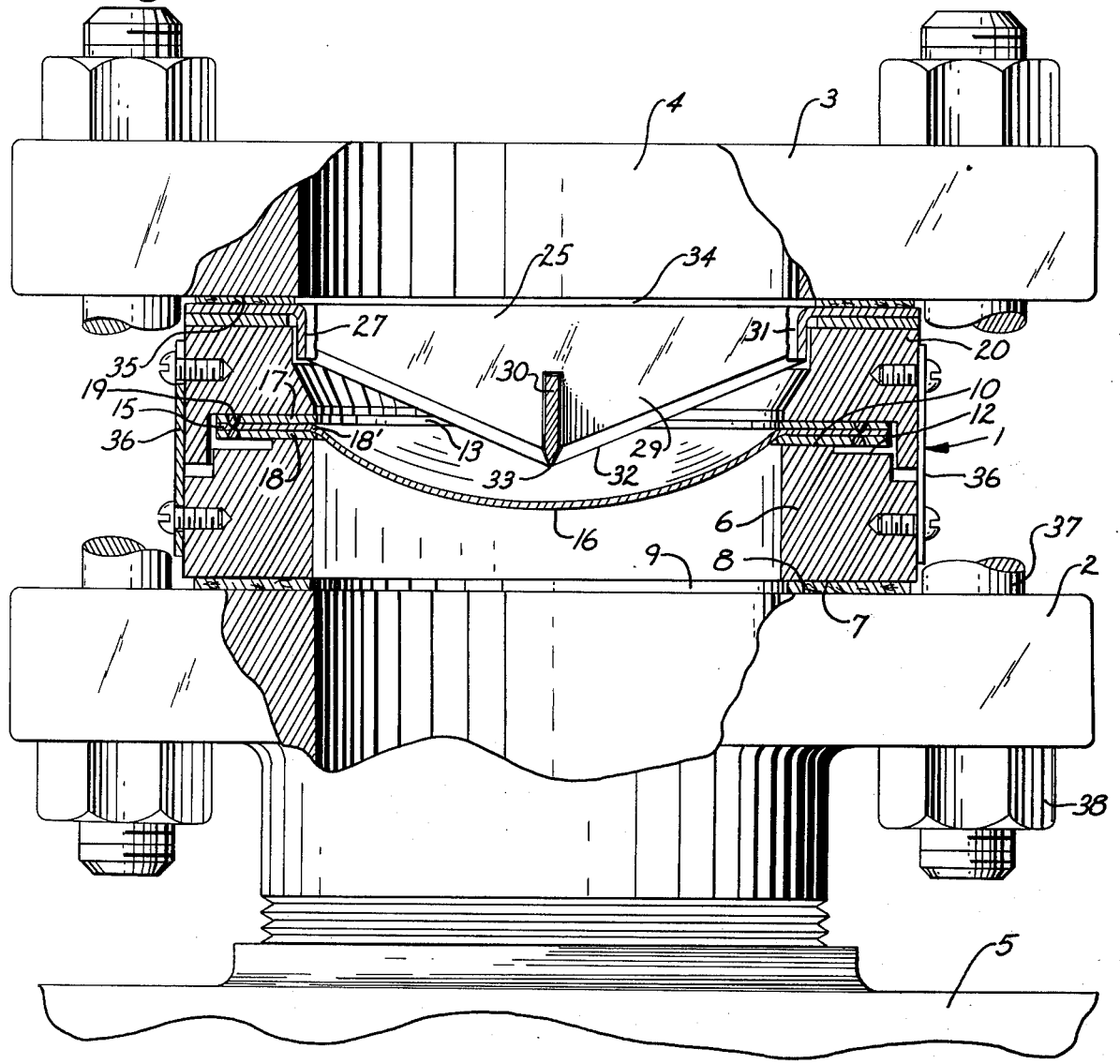
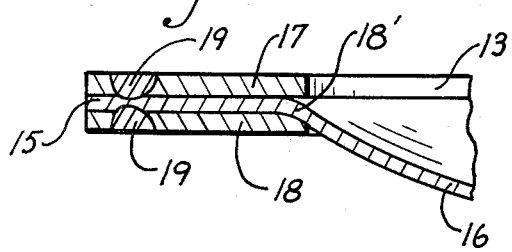
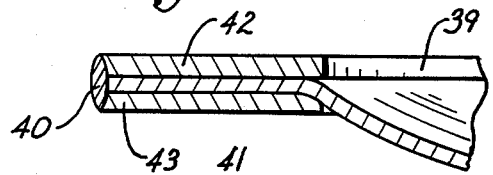

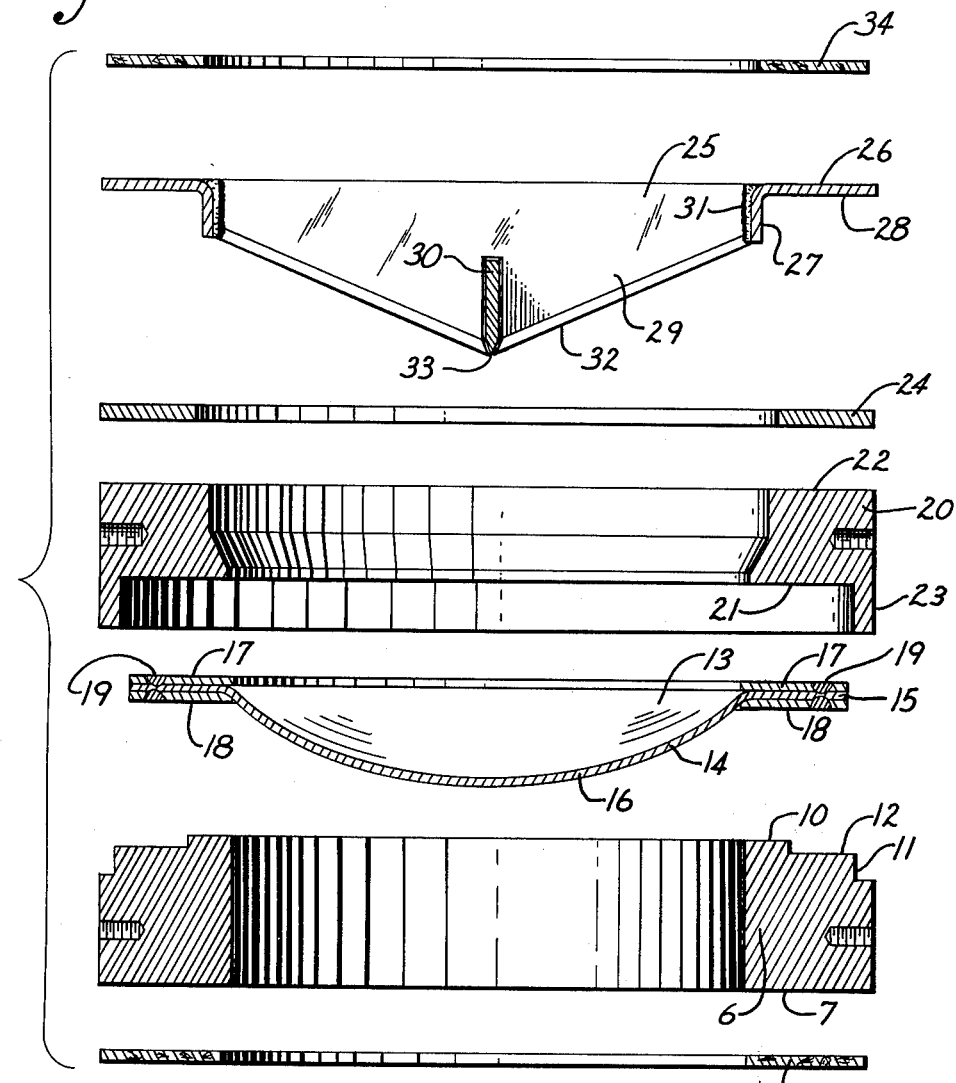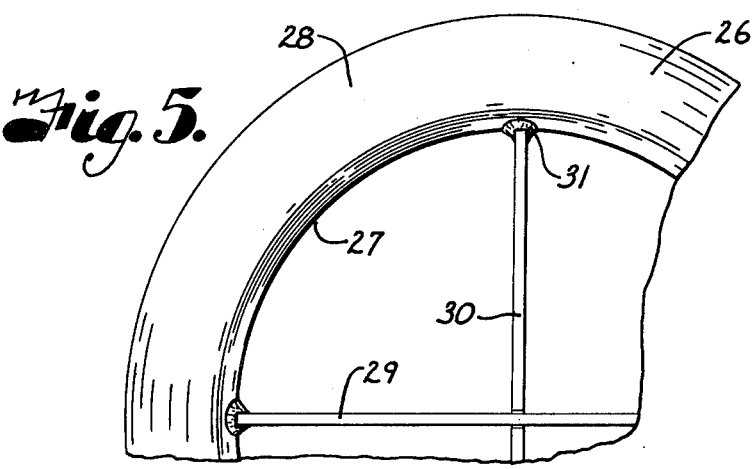

3,922,767

METHOD FOR PRODUCING PRE-MOUNTED RUPTURE DISCS

This application is a continuation-in-part of Application Ser. No. 189,567, filed Oct. 15, 1971 now abandoned.

This invention relates to safety pressure relief devices and more particularly to improvements in the production of pre-mounted, reverse buckling rupture discs.

Reverse buckling rupture discs have found increasing use as precision pressure relief devices which permit working pressures very close to rated rupture pressures. Such devices comprise a diaphragm, usually of relatively thin metal, which is centrally bulged and located in a pressure relief passageway with the convex surface of the bulge directed toward the higher pressure. To insure rupture when the rated pressure differential is exceeded, a sharp puncturing element, usually in the form of a knife blade, is located near the concave side of the bulge so that upon buckling, the collapsing metal is cut.

Care must be taken in the production, assembly and maintenance of such devices or narrow tolerance buckling pressures cannot be maintained. For example, the flange surrounding the bulged portion must be very accurately engaged by rounded supporting structure, particularly on the inlet side where the bulge is connected to the disc flange, or improper support or mounting stresses may substantially alter the predicted buckling pressure.

In producing the devices of this invention, the rupture disc flange and peripheral portion of the disc bulge are accurately and permanently secured against one, or between two, seating rings during manufacture so that the replacement of the disc in the field does not constitute a precision operation requiring particular care and skill. In fabricating the seating rings, and particularly the inlet ring, it was heretofore necessary to carefully machine or grind a radius on the inside corner or shoulder contacting the peripheral portion of the disc bulge and in a preferred method of manufacture, the disc was bulged through the inlet ring under fluid pressure, insuring an accurate fit. In practicing this invention, the inlet mounting ring inside corner disc supporting radius is produced by a basic punching operation, rather than grinding or machining, thus greatly reducing the cost of manufacture while retaining precision operation.

It is the principal objects of the present invention to provide a method of producing reverse buckling type pressure relief devices wherein the inlet ring disc supporting radius is produced without machining or grinding; to provide such a method which is compatible with the bulging of the disc through the ring under fluid pressure formation; to provide such a method which is substantially less expensive in forming the inlet ring radius; and to provide such a method which is reliable, accurate and highly advantageous for its intended purpose.

Other objects and advantages of this invention will become apparent from the following description taken in connection with the accompanying drawings wherein are set forth, by way of illustration and example, certain embodiments of this invention.

FIG. 1 is a fragmentary side elevation of a reverse buckling unit produced in accordance with this invention, being broken away showing details thereof.

FIG. 2 is an exploded cross-sectional view showing various components of the reverse buckling unit of FIG. 1.

FIG. 3 is a fragmentary cross sectional view on an enlarged scale showing one form of disc seating ring arrangement.

FIG. 4 is a fragmentary cross-sectional view on an enlarged scale showing a modified form of disc seating ring arrangement.

FIG. 5 is a fragmentary plan view showing details of a removable knife blade unit.

Figure 6:
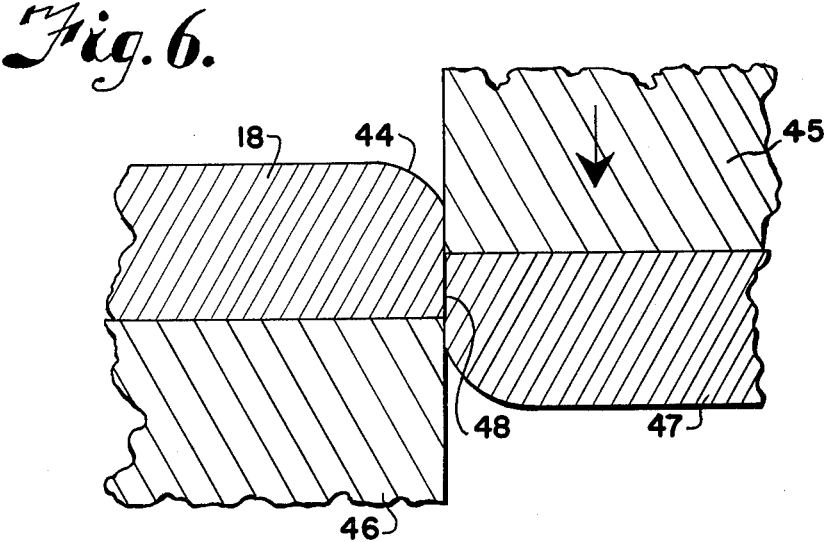
FIG. 6 is a cross-sectional detail on a greatly enlarged scale showing the disc support radius being formed on a mounting ring by punching.

The reference numeral 1 generally indicates a safety pressure relief device incorporating a pre-mounted rupture disc produced according to this invention. The device 1 is adapted for insertion between a pair of mounting flanges 2 and 3 which form a pressure relief passageway 4 leading from a pressure vessel 5. The device 1 includes a base flange or inlet ring 6 having a first surface 7 adapted to seal against a receiving surface 8 of the mounting flange 2, in this example utilizing a suitable gasket 9 therebetween. The inlet ring 6 has a second surface 10 opposed to the surface 7 and a circular peripheral recess 11, FIG. 2, spaced radially outwardly from the surface 10. A circular ledge 12 is positioned between the peripheral recess 11 and the surface 10.

A safety disc unit 13 comprises a rupture member 14, in this example of a metal such as stainless steel, consisting of a diaphragm having an annular flange portion 15 and a central dome or bulged portion 16. The unit 13 includes seating rings 17 and 18 of relatively thin cross-section and respectively positioned accurately on opposite sides of the disc flange portion 15 and permanently secured thereto, for example by circumferentially spaced spot welds 19, with the bulged portion 16 projecting through the seating ring 18, FIGS. 2 and 3. The rupture member 14 is shown in FIGS. 1-4 as greatly exaggerated in thickness with respect to the seating rings 17 and 18, typical thickness dimensions being discussed hereafter. The seating ring 18 is suitably sized, shaped and positioned to uniformly support the rupture member 14 at the important location 18' (i.e., in the area where the bulged portion 16 connects to the flange portion 15) under occasional "reverse" pressure, that is, with the lower pressure in the vessel 5. The seating ring 17 is likewise suitably sized, shaped and positioned to uniformly support the member 14 at location 18' during regular or "forward" pressure differentials.

An outlet ring 20 has a first surface 21 sized for sealing against the seating ring 17 and a second surface 22 opposed to the first surface 21. An axially projecting cylindrical lip 23 is positioned to receive the safety disc unit 13 thereinto to aid in centering when the seating ring 17 is urged against the first surface 21. A suitable gasket 24 is preferably supplied to aid in producing a seal between the second surface 22 and structure now described.

A knife unit 25 includes a mounting ring 26 having an interior tubular portion 27 and a flange portion 28 projecting radially therefrom. The tubular portion 27 and flange portion 28 are integrally connected and of relatively thin cross-section comparable to the disc unit seating rings 17 and 18, FIGS. 1 and 2. The knife unit 25 includes a pair of intersecting knife blades 29 and 30 permanently secured to the tubular portion 27, as by welds 31, and extending thereacross. The knife blades 29 and 30 have cutting edges 32 directed toward the disc unit 13 and sloping toward a central sharp point 33.

A gasket 34 is provided to aid in producing a seal between the knife unit flange portion 28 and the sealing surface 35 of the mounting flange 3.

When the parts of the device 1 are assembled, the bulged portion 16 projects into the inlet ring 6, toward the pressure vessel 5. The knife unit 25 projects into the outlet ring 20 with the point 33 exposed to and spaced a predetermined distance from the concave surface of the bulged portion 16. The tubular portion 27 of the knife unit 25 is closely received within the outlet ring 20, thereby being accurately centered upon assembly therewith. Likewise, the lip 23 of the outlet ring 20 provides centering for the disc unit 13 and also, by overlapping into the peripheral recess 11, produces positive coaxial alignment with the inlet ring 6. The ledge 12, being spaced closer to the inlet ring surface 7 than the surface 10, provides a relief area for the spot welds 19 so that any distortion associated therewith will not interfere with sealing between the inlet ring surface 10 and the outlet ring surface 10.

Side mounted bars 36 serve as pre-assembly hardware to maintain the inlet and outlet rings in proper relationship during preliminary handling. Heavy studs 37 extend through the mounting flanges 2 and 3 and are engaged with nuts 38 for retaining the parts in the desired high pressure contacting relationship for producing gas tight seals.

In operation, when the rated differential pressure across the bulged portion 16 is experienced, the bulged portion 16 collapses against the point 33 and cutting edges 32, cutting the material and thereby opening the passageway 4 for relieving pressure within the vessel 5.

In replacing the disc for subsequent operation, the preseated safety disc unit 13 is merely placed between the rings 6 and 20 and no particular care is required to insure proper seating due to the preassembled rings 17 and 18. The knife unit 25 is also easily replaced when desired, without the need for replacing or handling the ring 20.

Referring to FIG. 4, a second embodiment of the safety disc unit is illustrated and identified with the numeral 39. The disc unit 39 is similar in function and structure to the unit 13 described above except that the spot welds 19 have been replaced with a peripheral weld bead 40 which maintains the sandwiched condition between the disc flange portion 41 and the seating rings 42 and 43.

Figure 7:
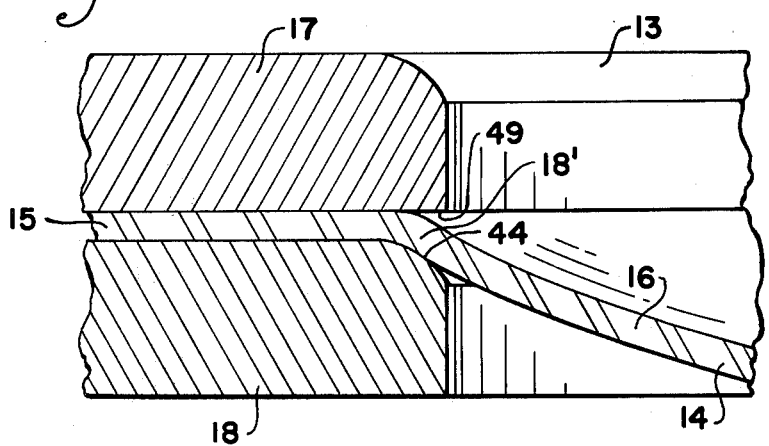
FIG. 7 is a cross-sectional detail on a greatly enlarged scale showing a typical disc support area formed by mounting rings.

The rupture member 14 may range in thickness from about 0.001 to about 0.035 inches with typical thicknesses falling between 0.0015 and 0.015 inches. Mounting rings may vary considerably but typically are not thinner than about 0.05 inches. When the mounting ring thickness falls within the range of about 0.05 to 0.10 inches it has been found unnecessary to machine or grind the radius 44 which supports the rupture member at the area 18', FIG. 7. Instead, advantage is taken of the natural tendency for a radius to form on a plate at the edge where a punch shears the metal past a receiving and supporting die.

Thus, with reference to FIG. 6, a punch 45 is illustrated cooperating with a supporting die 46 for punching the center 47 from a suitable blank to form the inlet supporting ring 18. During the punching operation, the metal near the shear area 48 is stretched and deformed in such a manner that radius 44 is typically neither a true radius nor a full 90° curve, it has been found to function as well as a machined or ground radius in the assembly and is perfectly suitable as a retainer radius, through which the disc may be bulged, for producing a zero tolerance inlet seating ring. In punching ring thicknesses of approximately 0.062 to 0.093 inches thickness, curved corners approximating 0.020-0.032 inches radius are typically formed from standard materials such as stainless steel, carbon steel, Monel and Inconel.

The use of seating rings having punched corner radii as described provides highly accurate rupture pressures, for example, ± 2% in the low to medium pressure ranges such as up to 175 psi. However, as the rupture pressure requirements increase, so does the rupture disc thickness and when the disc material thickness exceeds the radial width of the back-up area 49, which is normally not contacted by the disc (FIG. 7), it has been found that erratic rupture pressures result. In such cases, the radius 44 should be increased beyond that typically obtained by punching.

It is to be understood that, while certain forms of this invention have been illustrated and described, it is not to be limited thereto except insofar as such limitations are included in the following claims.

What we claim and desire to secure by Letters Patent is:

1. The method of producing a safety pressure relief device disc unit having a reverse buckling rupture member including an annular flange portion and a central bulged portion, said disc unit having a metallic inlet seating ring positioned on said disc flange portion and secured with respect thereto, said seating ring having an inner ring diameter many times greater than the thickness thereof and including an inner edge radius supporting said rupture member between said flange portion and said bulged portion, said method including the steps of producing said inner ring diameter and inner edge radius together with the producing of said ring from a blank through stretching and deforming the metal thereof by shear punching through a square corner die a portion therefrom to form said ring diameter and inner edge radius without material bending adjacent thereto, said inner edge radius being caused by metal flow during said punching operation without causing any deformation at the lower inner edge, engaging the rupture member with said punched ring adjacent said inner edge radius, and bulging a portion of said disc through said ring against said radius.

2. The method as set forth in claim 1 including the step of securing the rupture member to said punched ring.

3. The method as set forth in claim 1 wherein said inlet seating ring has a thickness in the range of about 0.05 to 0.10 inches.

4. The method as set forth in claim 1 wherein said inlet seating ring has a thickness in the range of about 0.062 to 0.093 inches and said rupture member has a thickness in the range of 0.0015 and 0.015 inches.

* * * * *